US009313470B2

(12) United States Patent
Ollivier et al.

(10) Patent No.: US 9,313,470 B2
(45) Date of Patent: Apr. 12, 2016

(54) SYSTEMS AND METHODS FOR DETERMINING AND COMMUNICATING CORRECTION INFORMATION FOR VIDEO IMAGES

(75) Inventors: Pierre Ollivier, Culver City, CA (US); Joachim Zell, Van Nuys, CA (US); Raymond Yeung, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 992 days.

(21) Appl. No.: 12/083,026

(22) PCT Filed: Oct. 28, 2005

(86) PCT No.: PCT/US2005/039576
§ 371 (c)(1),
(2), (4) Date: Apr. 2, 2008

(87) PCT Pub. No.: WO2007/050091
PCT Pub. Date: May 3, 2007

(65) Prior Publication Data
US 2009/0109344 A1    Apr. 30, 2009

(51) Int. Cl.
*H04N 7/173*     (2011.01)
*H04N 9/68*      (2006.01)
(52) U.S. Cl.
CPC ....................................... *H04N 9/68* (2013.01)
(58) Field of Classification Search
CPC ..................................................... H04N 7/173
USPC .......................................................... 725/93
See application file for complete search history.

(56) References Cited

U.S. PATENT DOCUMENTS

| 5,587,979 | A   | *  | 12/1996 | Bluthgen ................... 369/30.18 |
| 6,351,320 | B1  |    | 2/2002  | Shin |
| 6,771,323 | B1  |    | 8/2004  | Dean |
| 6,826,303 | B2  |    | 11/2004 | D'Souza et al. |
| 2002/0122044 | A1 |  | 9/2002  | Deering |
| 2002/0122194 | A1 |  | 9/2002  | Kuwata et al. |
| 2002/0140952 | A1 |  | 10/2002 | Fukasawa |
| 2003/0052904 | A1 | * | 3/2003  | Gu ................................ 345/691 |
| 2003/0193598 | A1 |  | 10/2003 | Takemura |
| 2004/0113864 | A1 |  | 6/2004  | Nonaka |
| 2004/0131249 | A1 | * | 7/2004  | Sandrew ........................ 382/162 |
| 2004/0196250 | A1 | * | 10/2004 | Mehrotra et al. ............. 345/102 |

FOREIGN PATENT DOCUMENTS

EP    0867880    9/1998
JP    7250346    9/1995

(Continued)

*Primary Examiner* — Kieu Oanh T Bui
(74) *Attorney, Agent, or Firm* — Robert D. Shedd; Joseph J. Opalach

(57) ABSTRACT

A method and system for determining correction information for the universal display of an original video sequence on a plurality of displays includes correcting an original video sequence using a first display, storing correction information related to the correction of the original video sequence using the first display, correcting the original video sequence using a different display, and determining and storing the differences between the correction information related to the correction of the original video sequence using the first display and using a particular, different display. Subsequently and prior to the display of the original video sequence, the original video sequence is corrected using a combination of the stored correction information related to the correction of the original video sequence using the first display and the respective determined differences, if any, related to a particular, different display on which the original video sequence is now to be displayed.

26 Claims, 5 Drawing Sheets

(56) References Cited

FOREIGN PATENT DOCUMENTS

| JP | 11088672 | 3/1999 |
|----|----------|--------|
| JP | 2000132155 | 5/2000 |
| JP | 2002314831 | 10/2002 |
| JP | 2002314937 | 10/2002 |
| JP | 2004112169 | 4/2004 |
| JP | 2004228734 | 8/2004 |
| KR | 2001002261 | 1/2001 |

* cited by examiner

SYSTEMS AND METHODS FOR DETERMINING AND COMMUNICATING CORRECTION INFORMATION FOR VIDEO IMAGES

This application claims the benefit, under 35 U.S.C. §365 of International Application PCT/US2005/039576, filed Oct. 28, 2005 published in accordance with PCT Article 21(2) on May 3, 2007, in English.

FIELD OF THE INVENTION

The present invention relates generally to video imaging and, more particularly, to a method and system for determining, storing and communicating color correction information for the universal display of corrected video content on a plurality of display types.

BACKGROUND OF THE INVENTION

Video technology in the context of video viewing has, in the past, been limited to the only viewing technology that was used in consumer domain; the technology used cathode ray tubes (CRT). Therefore, one single color standard, REC609 was used for standard definition, and then REC709 was used for high definition display in virtually all applications. Digital cinema has standardized a new color setting, namely P7V2 for digital projectors. Other standards may be developed in the future as well.

Current practice includes that each venue have a master file created for its specific viewer type. As long as the number of display types is kept small (i.e., CRT and now digital cinema), the distributions of one single master (possibly after compression) has been kept unique for that particular distribution business. However, with an increased variety of complex display technologies having new color capabilities, there will be problems with limitations of display capability (e.g., due to REC609/709 and other parameters like brightness, contrast ratio, etc.), or complexity of distribution, to address each display technology specifically.

It would be advantageous to provide a system and method to address a plurality of digital display technologies using the same media.

SUMMARY OF THE INVENTION

The present invention addresses the deficiencies of the prior art by providing a method and system for determining, storing, and communicating color correction information for the universal display of corrected video content on a plurality of display types.

In one embodiment of the present invention, a system for communicating a video sequence for different display types includes a translation module. The translation module receives an original sequence and corrects the original sequence in accordance with correction information stored in a first lookup table to form a corrected sequence that may represent the artistic intent viewed on a specific display type, which is usually commonly used in correction environments. The present invention may also include configurations with any display types not necessarily currently adopted in correction techniques and systems. The translation module further adjusts the corrected sequence in accordance with a second lookup table selected form a group based upon a display type on which the corrected sequence is to be rendered.

In one embodiment, a system for determining image correction information includes a corrector module used to adjust an original video sequence such that the original video sequence is maintained in its original form (in alternate embodiments also including compressed forms of the original) and the correction information is stored separately from the original form of the video sequence. The translation module translates the correction information into a lookup table for storage where the lookup table and the original form (in alternate embodiments also including compressed forms of the original) are combined at playback to provide a corrected video sequence.

In another embodiment, a method for providing a video sequence to any of a plurality of display types includes maintaining an original video sequence in its original form, separately maintaining correction information associated with the original video sequence and translating the original video sequence and the correction information into a corrected video sequence. The corrected video sequence is then translated into any of a plurality of display types by identifying a display type for rendering the corrected video sequence and selecting a display file which adjusts the corrected video sequence for that display type.

BRIEF DESCRIPTION OF THE DRAWINGS

The teachings of the present invention can be readily understood by considering the following detailed description in conjunction with the accompanying drawings, in which.

Figure 1:
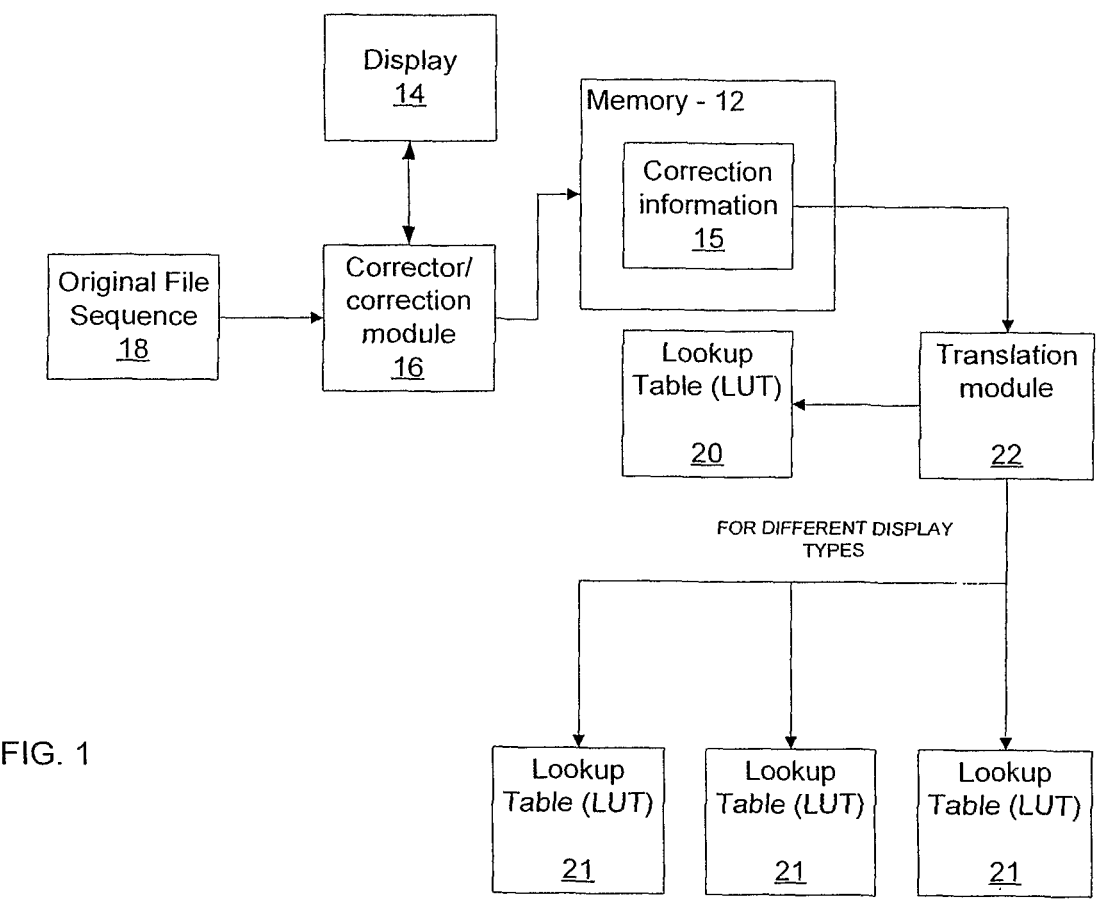
FIG. 1 depicts a high level block diagram of a system for determining, storing and communicating color correction information for the universal display of corrected video content on a plurality of display types in accordance with one embodiment of the present invention.

To facilitate understanding, identical reference numerals have been used, where possible, to designate identical elements that are common to the figures. It should be understood that the drawings are for purposes of illustrating the concepts of the invention and are not necessarily the only possible configuration for illustrating the invention.

DETAILED DESCRIPTION OF THE INVENTION

The present invention provides a system and method for determining, storing and communicating color correction information for the universal display of corrected video content on a plurality of display types. Although throughout the teachings herein and in various illustrative embodiments of the present invention, the aspects of the present invention are described with respect to systems and methods which employ color correction data files for video signals, the specific embodiments of the present invention should not be treated as limiting the scope of the invention. It will be appreciated by those skilled in the art and informed by the teachings of the present invention that the concepts of the present invention can be advantageously applied in substantially any system or method for not only the color correction of video signals, but also for the color adjustment, grain changes, brightness contrast, etc. of video signals and combination video/audio signals. Furthermore, the elements depicted in the various figures herewith may be implemented in various forms of hardware, software or combinations thereof. Preferably, these elements are implemented in a combination of hardware and software on one or more appropriately programmed general-purpose devices, which may include a processor, memory and input/output interfaces.

In accordance with various described embodiments of the present invention, determining and saving information about color or other adjustments made to a raw, original video signal at the very early stage of post-production color correction is made, such that a digital master file is able to be used in various viewing environments without the need for recreating a master file for each application. In addition, the captured and saved information can be conveyed, in readily usable form, to various possible users of the raw video data signal. For example, in one application, a digital video disk (DVD) may be equipped with information for seamlessly displaying video content on varies displays such as a CRT, rear projection television, liquid crystal display, high definition display, and the like.

One aspect of the present invention includes providing a system and method that permits a user (e.g., a colorist) to capture and store, for each set of consecutive frames, typically a scene or a subset of a scene, color corrected video data in a file, such as a map (e.g., a lookup table (LUT)) characterizing the color corrections made for that set of consecutive frames. Unlike a typical Color Decision List (CDL), in various embodiments of the present invention, the LUT is based primarily on various differences in signal/data characteristics between the input raw video data signal for the frame and the output color corrected video data signal for the frame. In various embodiments, the systems and methods of the present invention provide for the capture and storage of the created maps (LUTs) in real time, that is, during the color correction process. The capture and storage can be manually initiated by an operator, or the process can be automated.

FIG. 1 depicts a high level block diagram of a system 10 for determining, storing and communicating color correction information for the universal display of corrected video content on a plurality of display types in accordance with one embodiment of the present invention. Details of the individual block components making up the system architecture which are known to skilled artisans will only be described in details sufficient for an understanding of the present invention. The system 10 of FIG. 1 illustratively comprises an original file sequence (video) source 18, a correction module 16, a display device 14, a translation module 22, a primary LUT 20, a plurality of secondary LUTs (illustratively three secondary LUTs) 211-213, and a local memory 12. The display device 14 can be a type of display that is commonly used in the post-production business or any display type that would be used, either to serve as reference display or as a quality check tool to validate display related LUTs.

Initially, an original video signal (file sequence) is communicated from the video source 18 to the correction module 16. The correction module 16 is employed by an operator to correct/adjust the original video image (and/or audio) using an associated display device 14. The correction can include color correction, granularity, pixel averaging, blending or any other editing to either the video or audio components of the file sequence. This correction can be accomplished by employing one or more software programs for altering/enhancing the original file sequence while viewing the file sequence on the display device 14. For example, the correction module 16 can include an audio/video editing tool adapted to store editing information separately from the underlying original video sequence. The correction information 15 is subsequently communicated to and stored in the local memory 12.

The original file sequence provides the baseline or raw video signal (and audio, if applicable) for rendering digital information. For example, the original file sequence can include one or more frames of unedited video for a movie. In accordance with one embodiment of the present invention, the original file sequence is corrected manually (or automatically) via, for example, the correction module 16 and the display device 14 and the changes or enhancements made (correction information) are stored in the local memory 12 as described above. The correction information is communicated to the translation module 22 which creates a lookup table (LUT) 20, and the created LUT is stored separately from the correction information in the local memory 12.

The LUT 20 includes color corrections and other digital enhancements that have been applied to the original video signal. In addition, start and end time codes for the corrected video sequences in the original file sequence are determined by the correction module 16 and provided to the translation module 22 to index the respective correction information in the LUT 20 and to correlate the corrections with respective locations in the original file sequence. For example in one embodiment of the present invention, the translation module 22 correlates time codes with the corrections/enhancements. For example, frames 100-155 of an original file sequence can have pixels at addresses A, B and C which are adjusted to, for example, Red 200, Green 550 and Blue 345. The adjustment information is catalogued in the LUT 20. In an alternate embodiment of the present invention, coefficients or operators may be specified for given pixels or group of pixels. For example, in a LUT matrix, a pixel location may be specified with a red multiplier of 0.68. This means that the original sequence pixel value is multiplied by 0.68 for a given color, in this case red. That is, each position in the matrix/LUT may include a color vector (0.68, 1.2, 0.89) respective to, for example, Red (0.68), Green (1.2) and Blue (0.89) coefficients. The numerical values and examples depicted directly above are arbitrary and are for illustrative purposes only. In still an alternate embodiment of the present invention, pixel corrections may be made as a function of other pixels or other criteria or computations.

In accordance with the present invention, additional LUTs 21 can be created and stored for different display types. For example, one LUT 21 may be stored for CRT displays, one LUT 21 for liquid crystal displays (LCD), one LUT 21 for a rear projection TVs, etc. Each LUT 21 will advantageously be applied to the original film sequence enhanced by the original LUT 20 for that sequence using time codes to index as described above. For example, if in the system 10 of FIG. 1, the original file sequence from the original file sequence source 18 is subsequently corrected using a different display device (e.g., display device 14A), then new correction information (e.g., correction information 15A) will be determined by the correction module 16 and stored in the local memory 12. In addition, the translation module 22 will determine a new LUT 20 (e.g., LUT 20A) for the newly corrected file sequence. Any differences between the LUT 20 created using the first display device 14 (i.e., the display device first used originally to correct the original file sequence) and the LUT 20A created using the second display device 14A is used to determine an LUT 21 for that particular display device type 14A. The newly determined LUT 21 is communicated to and stored in the local memory 12 for future use. Similarly, LUTs 21 for other types of display devices can be determined and stored as described above.

It should be understood that an LUT 20 may apply to a sequence as small as a single frame or as large as an entire video depending on the enhancements and color corrections used. It should also be noted that while the present invention may be employed for color corrections, the embodiment disclosed herein may be applied to granularity, gray scale adjustment, contract or brightness enhancement, or may include metadata or other information associated with the images.

Another aspect of the present invention provides a system and method that permits the determined LUTs for an original video content to be provided to end users (e.g., viewers, distributors, digital cinema, etc.) of the raw video data signals. In accordance with various embodiments of the present invention, the LUTs can be provided to the various users in a variety of ways. For example, in one embodiment of the present invention, the determined LUTs are written onto transferable media (i.e., the LUTs are written onto a DVD along with the raw video data signals). In alternate embodiments of the present invention, the LUTs are transmitted in conjunction with the raw video data signals to a signal receiver. The signal receiver can be, for example, a viewer, a cable operator, a digital cinema system, or any system used for distribution that exists today (e.g., satellite head-end, VOD aggregator, etc.), or will exist in the future, whether it has already been invented or not. The LUTs of the present invention can be stored in, or downloaded to, a memory, for example in a set top box, television set, DVD player or other apparatus used to process video signals before the display of the video signals.

Figure 2:
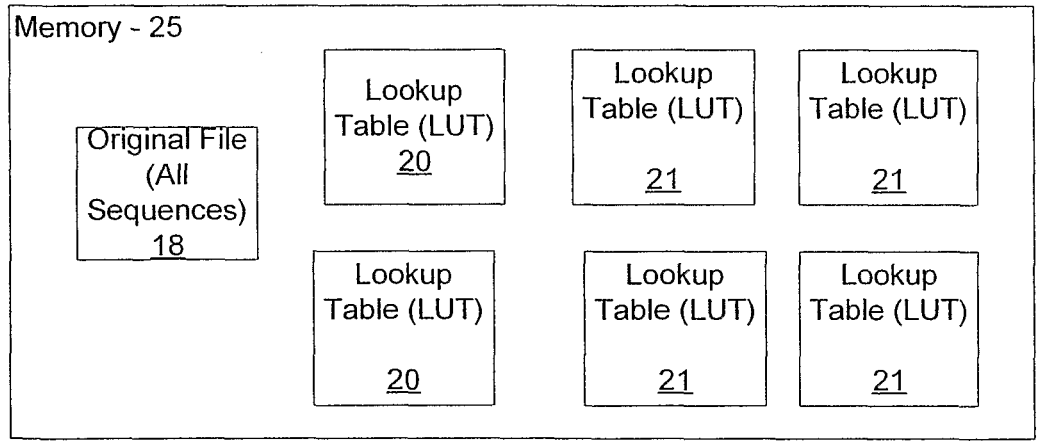
FIG. 2 depicts a high level block diagram of a portable media device having original content stored with correction information and display type conversion information for different display types in accordance with an embodiment of the present invention.

FIG. 2 depicts a high level block diagram of a portable media device having original content stored with correction information and display type conversion information for different display types in accordance with an embodiment of the present invention. For example, the portable media device of FIG. 2 illustratively comprises a media storage device 25 receiving, for example, the output of the translation module 22 of FIG. 1. The media storage device 25 can include any media storage device including hard disks, DVD, CD, floppy disk or any other media storage device. In one embodiment of the present invention, the original file sequence 18, LUTs 20 and LUTs 21 are recorded on the media storage device 25. The media storage device 25 then includes all the content, either in compressed (in which case the translation module 22 may include an image compression algorithm) or a non-compressed format, to provide the video sequences applicable to a given title of content package (e.g., a movie). Advantageously, the media storage device 25 can then be played and rendered on any display type as will be described in greater detail below. It should be understood that a user viewing a video can be granted access to the LUTs 20 and 21 as well as the original sequence content (compressed or not). In addition, the combined and corrected sequences can also be viewed.

Figure 3:
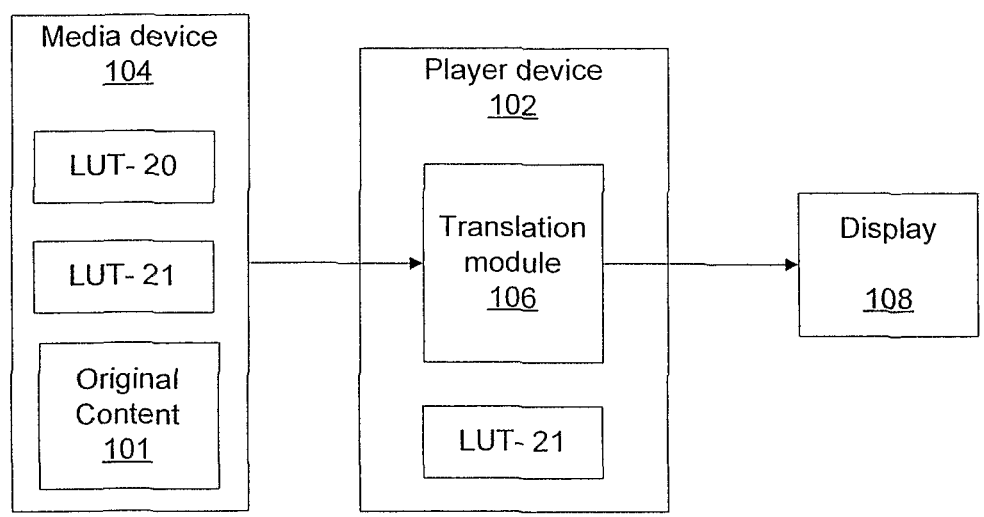
FIG. 3 depicts a high level block diagram of a system for combining and communicating an original file as enhanced by the correction information and further including adapting the enhanced sequence for different display types in accordance with an embodiment of the present invention.

FIG. 3 depicts a high level block diagram of a system 100 for combining and communicating an original file as enhanced by the correction information and further including adapting the enhanced sequence for different display types in accordance with an embodiment of the present invention. System 100 includes a player device 102 which is capable of playing video stored on a media storage device 104. The media storage device 104 may comprise a hard disk which stores saved or downloaded content, DVD, CD, video cassette, floppy disk or other media storage device. The player 102 may include a VCR, DVD player, set top box, computer, or other player device. Player 102 can be a sophisticated device such as a computer or a set top box or less sophisticated (e.g., VCR). The player 102 includes a LUT translation module 106, which may include a decompression/decoding algorithm in case the original content was previously compressed by the translation module 22. The translation module 106 provides essentially a reverse operation from the translation module 22 of FIG. 1.

The translation module 106 can be implemented in hardware and/or in software and is adapted to implement the translation process to add data stored in LUTs 20 to original file data both of which preferably are stored on the media device 104. In addition, the media device 104 has stored thereon LUTs 21 that provide transformations of LUT 20 converted original sequence into the appropriate display type. The translation module 106 uses an algorithm(s) that, in one embodiment, transforms the correction information from a matrix and coefficients (LUT 20), and associates this to a time-code range to apply the changes to the original sequence. The output may be stored and/or provided to a "viewer" system for loading and viewing.

A display 108 may include a CRT, LCD, high definition of other type of display. The type of display may be a user-selected option or may be a plug-and-play type feature where the type of display is sensed, input by a user or previously provided at set-up. The selection of the display enables the appropriate LUT 21 to be combined with the enhancements of LUT 20 in the original sequence for a given sequence or frame within the video. In this way, the appropriate LUTs 20 for a given sequence are combined with the original file sequence for a particular display type as provided by a respective LUT 21.

There is a plurality of ways of performing these processes. In one embodiment, LUT translation module 106 and LUTs 20 are stored on the same media as the original file sequence 18. LUTs 21 can be provided or created in the player device and used to correct the display type for the corrected video sequence.

Figure 4:
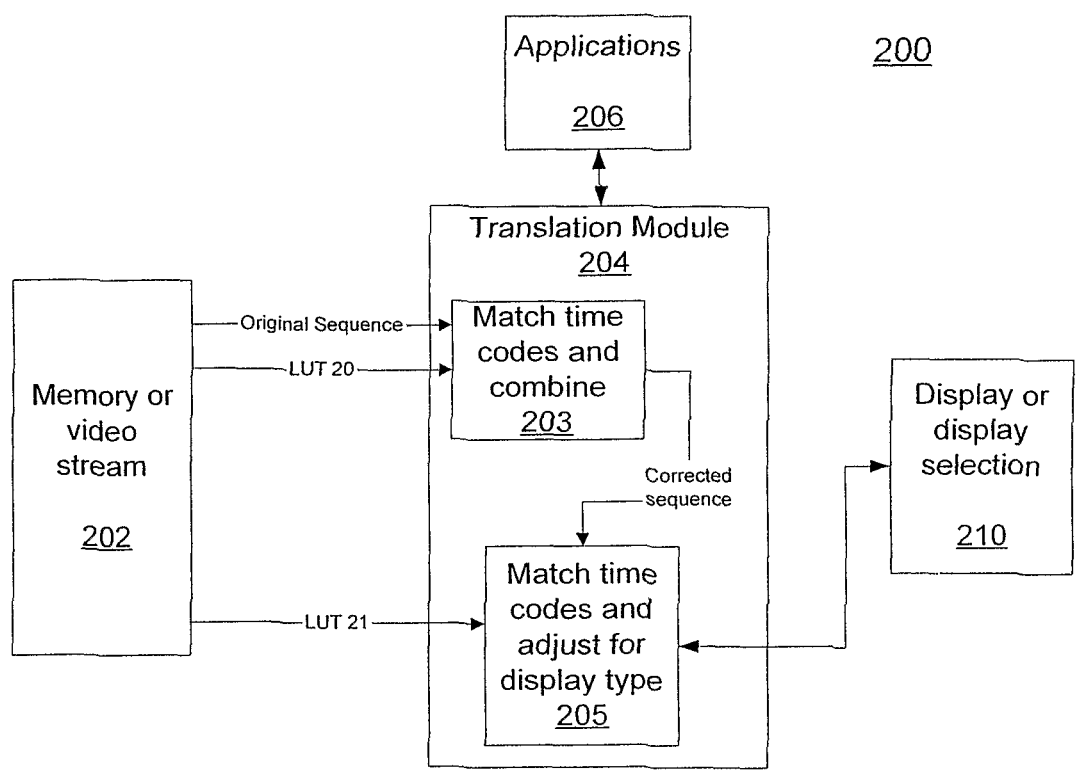
FIG. 4 depicts a high level block diagram of a system for translating lookup tables for rendering by a display or displays of a same or different types in accordance with an embodiment of the present invention.

FIG. 4 depicts a high level block diagram of a system 200 for translating lookup tables for rendering by a display or displays of a same, or different types, in accordance with an embodiment of the present invention. The system 200 can be implemented in hardware, software or a combination of both. System 200 may be loaded or installed in, for example, a set top box, a video player or even a television or display depending on the system.

In the system 200 of FIG. 4, an original file sequence including one or more video frames is stored in a memory device 202 (e.g., a hard disk) or streamed on a bus 202 and communicated to a translation module 204. The translation module 204 identifies the time code ranges for the sequence and associates the appropriate LUTs 20 with the original sequence. The LUTs 20 may include information regarding color adjustment, grain changes, brightness contrast or any other edits to the sequence. The LUTs 20 may trigger other applications 206 for performing computations or averaging of pixels in the sequence to provide updates to pixel values, etc. The applications 206 may include any number of modules or subroutines that can be called to perform pixel adjustments or manipulations. The application 206 is optional and may be dependent on the processing capabilities of the system 200.

Again and as described above, LUTs 20 include the color correction information (or other information) used to correct, edit or alter a video sequence. This information may take the form of a matrix with new color values for pixels or with a function to adjust the values of the original pixel values in the original sequence. For example, the red value for all pixels may be reduced by 50 (e.g., red pixel value—50) or the red values may simply be assigned a new value. One or more LUTs 20 may be associated with the sequence within a time code range. There may be layers of alterations, for example, one LUT to change red, one LUT for green, one LUT for blue and one for averaging pixels or for performing some other function, all for the same time code range. After the LUTs 20 have been applied to the original sequence, a respective display type LUT 21 is employed to adjust the image for the combined sequence to provide seamless display on any one of a plurality of display types. For example, a LUT 21 is provided for CRT, a different LUT 21A for LCD, another LUT 21B for rear projection TV, a LUT 21C for high definition TV, etc.

In one embodiment of the present invention, the LUTs 21 are applied to the LUT 20 and original sequence combination. However, in alternate embodiments of the present invention, a LUT 21 is applied before the LUTs 20. The LUT 21 provides the appropriate formatting and adjustments needed to conform the sequence for display on a given display type. The display type may be communicated to the translation module 202 by a display 210, by the user (e.g., using setup functions) or by the system 200 when it is determined on which type of display the video sequence will be displayed. The output from the translation module 202 may advantageously be delivered to multiple display types simultaneously by simply applying the appropriate LUT 21 for the respective display type.

The LUTs 21 are preferably associated with the original file sequence based on the time range of the video sequence. This time information can be further employed to permit the translation module 202 to send video signals to multiple video displays depending on the time code information. For example, a first time sequence is displayed on a CRT, a second time sequence on a LCD, etc.

The concepts of the present invention also address deficiencies associated with providing LUTs on the media used for the underlying content. That is, typically, LUTs tend to be exceedingly large and impractical for the transfer of such files on the media used for the underlying content. As such, the inventors provide herein a system and method for managing and transferring large numbers of LUT's in a distributed environment. That is, in accordance with the present invention, one or more LUTs are definable/tunable on a set-of-frames by a set-of-frames basis. This is performed for each LUT of a particular set of frames by employing an algorithm that creates a new matrix, (e.g., LUT') that includes far fewer coefficients than the original LUT. The reduced number of coefficients is combined with an algorithm transported with the content, or stored locally, to an end-user, which reconstructs the LUT mathematically before the content is rendered on the display. For example, in one embodiment, the present invention includes a 3×3 matrix of 9 coefficients, each one being plotted as a function of only one color component of the original content, in which, for example, film celluloid based cross talk is represented by non-diagonal coefficients. The reconstructed 3D LUT will be the list of all possible combinations of output color values resulting from all possible input color values after the application of the 3×3 matrix algorithm.

The combination of matrix coefficients resulting from the processing of all LUTs from all sets of the subject frames is loaded in the appropriate order, along with the exact set of frames to which it is supposed to be applied. In this case, the matrices and coefficients can be provided on media such as DVDs, downloaded and/or stored locally in a viewer (e.g., set top box), cable head-end or digital cinema unit. As such, in accordance with the present invention, all that needs to be provided to define the LUT for each set of frames is a matrix identifier for selecting the appropriate matrix to be loaded for each set of frames. This process may be automated in such a way that the process does not need manual intervention at the viewer stage. For example, in one illustrative embodiment, each time a set of frames refers to a matrix, the resulting LUT is computed using an RGB signal and the matrix coefficients, and the new RGB color values resulting from this combination are communicated to a respective display unit.

Figure 5:
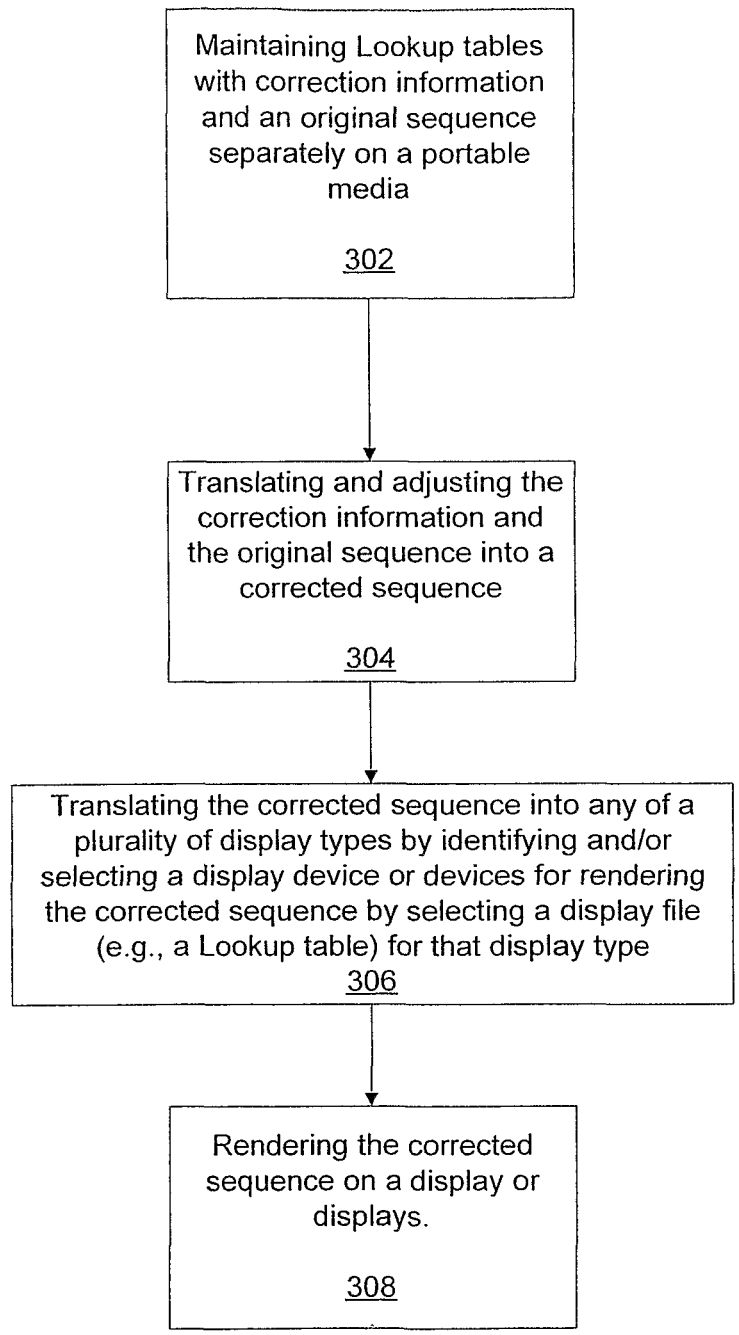
FIG. 5 depicts a block/flow diagram of a method for translating and rendering video in accordance with an embodiment of the present invention.

FIG. 5 depicts a block/flow diagram of a method for translating and rendering video in accordance with an embodiment of the present invention. In block 302, an original video sequence, in its original form, and correction information associated with the original video sequence are separately stored, preferably, on a same portable media storage device such as a DVD or video cassette. Alternatively, the original video sequence and the correction information can be stored separately on different storage devices. In block 304, the original video sequence and the correction information are translated into a corrected video sequence. In one embodiment, the time codes for the original sequence and those indicated in the correction information maintained in, for example a lookup table, are combined to provide a corrected video sequence.

In block 306, the corrected video sequence is translated onto any of a plurality of display types by identifying a display type for rendering the corrected video sequence and selecting a display file which adjusts the corrected video sequence for that display type in accordance with the details of the present invention as described above. Advantageously, because of the concepts of the present invention, different display types no longer present problems for displaying corrected video as the corrected video sequence can be adapted to any and all of the display types using an appropriate lookup table in accordance with the present invention. In block 308, the corrected video sequence is rendered on the display type and/or on a plurality of display types.

Having described preferred embodiments for systems and methods for determining and communicating correction information for video images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for determining correction information for at least two different display types, comprising:
   a) generating first correction information for correcting at least one video sequence within a video content file for a first of the at least two different display types;
   b) storing the first correction information;
   c) generating different correction information for correcting said at least one video sequence for a second display type different from the first display;

d) determining and storing differences between the first correction information and the different correction information; and e) repeating c)-d) for each of said at least two different display types.

2. The method of claim 1, wherein prior to a subsequent display of said video content file, said at least one video sequence is corrected using a combination of said first correction information and respective different correction information, if any, related to a particular different one of said at least two different display types on which said video content file is to be displayed.

3. The method of claim 1, wherein said first and different correction information is stored in respective look-up tables.

4. The method of claim 3, wherein said look-up tables comprise start and end time codes for corrected video sequences to index respective correction information and to correlate corrections with respective locations in an original video content file.

5. The method of claim 1, wherein said first and different correction information comprises information regarding correction of at least one of a color adjustment, grain changes, and brightness contrast of said at least one video sequence.

6. The method of claim 1, wherein said original video content file and said first and different correction information are stored on a portable media storage device.

7. A method for providing, to a remote location, correction information for the display of a video content file on at least two different display types, comprising:
a) generating first correction information for correcting at least one video sequence within a video content file for a first of the at least two different display types;
b) storing, on a portable media storage device, the first correction information;
c) generating different correction information for correcting said at least one video sequence for a second display type different from the first display type;
d) determining and storing, on said portable media storage device, differences between the first correction information and the different correction information; and
e) repeating c)-d) for each of said at least two different display types;
f) storing, on said portable media storage device, said video content file including said at least one video sequence; and
g) providing said portable media storage device to said remote location for the display of said video content file, wherein prior to the subsequent display of said video content file, said at least one video sequence is corrected using a combination of said first correction information and respective different correction information, if any, related to a particular different one of said at least two different display types on which said video content file is to be displayed.

8. The method of claim 7, wherein said first and different correction information is stored in respective look-up tables on said portable media storage device.

9. The method of claim 7, wherein said portable media storage device comprises at least one of a digital video disk (DVD) and a video cassette.

10. A system for determining correction information for the display of at least one video sequence within a video content file on at least two different display types, comprising:
at least two displays corresponding to the two different display types for displaying said video content file; and
a corrector module, in conjunction with inputs from a user, adapted to perform:
a) generating first correction information for correcting at least one video sequence within a video content file for a first of the at least two different display types;
b) storing the first correction information;
c) generating different correction information for correcting said at least one video sequence for a second display type different from the first display type;
d) determining and storing differences between the first correction information and the different correction information; and
e) repeating c)-d) for each of said at least two different display types.

11. The system of claim 10, further comprising a translation module for translating the first and different correction information into respective lookup tables for storage wherein a respective lookup table and the video content file are combined at playback to provide a corrected video content file on a respective one of said at least two different displays.

12. The system of claim 11, wherein the translation module associates corrected color information for video pixels with time codes for a given sequence for storage in the respective lookup tables.

13. The system of claim 11, wherein the video content file and the respective lookup tables are stored separately on a portable media storage device.

14. The system of claim 13, wherein said portable media storage device comprises a digital video disk (DVD).

15. The system of claim 11, wherein the translation module is provided in at least one of a set top box and a video player.

16. The system of claim 11, wherein the respective lookup tables comprise a plurality of sub-lookup tables, each of which is associated with a different aspect of said at least one video sequence to be corrected.

17. The system of claim 10, wherein said corrector module comprises a video editing tool adapted to perform said correcting.

18. The system of claim 10, wherein said first and different correction information comprises information regarding correction of at least one of a color adjustment, grain changes, and brightness contrast of said at least one video sequence.

19. The system of claim 10, further comprising rendering the corrected video sequence on a respective display.

20. A method for providing a corrected video sequence to any of a plurality of display types, comprising:
maintaining an original video sequence in its original form and separately storing correction information associated with the original video sequence;
translating the original video sequence and the correction information into a corrected video sequence; and
translating the corrected video sequence into any of a plurality of display types by identifying a display type for rendering the corrected video sequence and selecting a display file which adjusts the corrected video sequence for that display type.

21. The method of claim 20, wherein the original form is uncompressed, the video translated is compressed and wherein the correction information includes an algorithm of how to apply correction information the original video sequence, whether coded and/or decoded, before it is actually rendered as an uncompressed corrected video sequence.

22. The method of claim 20, wherein the translating the original video sequence and the correction information into a corrected video sequence includes adjusting the original video sequence in accordance with the correction information stored in a lookup table for a corresponding time code range of the original video sequence.

23. The method of claim 20, wherein the translating the corrected video sequence into any of a plurality of display types includes providing a lookup table as a display file for each of a plurality of display types and selecting one of the lookup tables for the display type for rendering.

24. A method for determining color correction information for different display types, comprising:
   a) determining first correction information for color correcting at least one video sequence within a video content file;
   b) storing the first correction information;
   c) determining respective correction information for color correcting said at least one video sequence for display on a specific one of said different display types;
   d) determining and storing differences between the first correction information and the respective correction information determined for the specific display type; and
   e) repeating c)-d) for a different display type.

25. The method of claim 24, wherein prior to the display of said video content file on a specific display type, said at least one video sequence is corrected using a combination of said first correction information and the respective correction information determined for said specific display type.

26. The method of claim 24, wherein said first correction information is subtracted from said respective correction information determined for said specific display type to determine resultant correction information for color correcting said at least one video sequence for displaying said video content file on said specific display type.

* * * * *